(12) United States Patent
Harris et al.

(10) Patent No.: US 9,995,433 B2
(45) Date of Patent: Jun. 12, 2018

(54) OIL CLEANER WITH HEATED EVAPORATION SURFACE, TO REMOVE WATER AND VOLATILES

(71) Applicants: John Arthur Harris, Sandy, UT (US); Gyle Gordon Thornhill, Mesa, AZ (US)

(72) Inventors: John Arthur Harris, Sandy, UT (US); Gyle Gordon Thornhill, Mesa, AZ (US)

( * ) Notice: Subject to any disclaimer, the term of this patent is extended or adjusted under 35 U.S.C. 154(b) by 0 days. days.

(21) Appl. No.: 13/694,595

(22) Filed: Dec. 14, 2012

(65) Prior Publication Data

US 2013/0341259 A1    Dec. 26, 2013

Related U.S. Application Data

(60) Provisional application No. 61/634,318, filed on Feb. 27, 2012.

(51) Int. Cl.
| | | |
|---|---|---|
| *B01D 1/00* | (2006.01) | |
| *B01D 3/00* | (2006.01) | |
| *B01D 17/00* | (2006.01) | |
| *B01D 19/00* | (2006.01) | |
| *F16N 39/00* | (2006.01) | |
| *B01D 35/18* | (2006.01) | |
| *B01D 29/05* | (2006.01) | |
| *C10G 21/00* | (2006.01) | |
| *C10G 7/00* | (2006.01) | |

(Continued)

(52) U.S. Cl.
CPC ......... *F16N 39/005* (2013.01); *B01D 29/055* (2013.01); *B01D 35/185* (2013.01)

(58) Field of Classification Search
CPC .......... B01D 1/00; B01D 17/00; B01D 35/18; B01D 35/185; B01D 3/00; B01D 3/28; B01D 19/00; B01D 29/055; B01D 35/14; C02F 1/02; C10C 1/20; C10G 21/00; C10G 33/06
USPC ............... 123/196, 523, 530; 184/6.24, 109; 196/46, 46.1, 112, 114, 115, 121, 123, 196/124, 125, 126, 128, 137, 149; 210/78, 85, 90, 120, 168, 175, 180, 181, 210/182, 183, 184, 188, 189; 250/429, 250/436, 438; 422/24
See application file for complete search history.

(56) References Cited

U.S. PATENT DOCUMENTS 2,206,358 A * 7/1940 Koinzan ................ B01D 27/02
210/123
3,771,656 A * 11/1973 Leaming .................. 210/167.04
(Continued)

*Primary Examiner* — Hayden Brewster
(74) *Attorney, Agent, or Firm* — Holland & Hart, LLP

(57) ABSTRACT

A circulating oil stream cleaner wherein oil to be cleaned is passed through filter medium to remove particulates carried by the circulating oil and through an evaporator unit having a flat, inclined, evaporation surface comprising a top surface of a heat conductive heating block with an electric heater probe therein and positioned closely beneath the heating surface and, with the circulating oil being conductively heated as it passes beneath the heating block, up a frontal end of the heating block and cascades onto and spreads as a film over and then off the heating surface of the heating block through an exit port of the evaporator unit; an evaporation chamber provided above the heating surface allows heated air to circulate over and convectively heat the film of oil and to escape with entrained water and volatiles.

30 Claims, 4 Drawing Sheets

(51) Int. Cl.
*C10G 17/00* (2006.01)
*C10G 32/00* (2006.01)

(56) References Cited

U.S. PATENT DOCUMENTS

| | | | |
|---|---|---|---|
| 4,295,966 A * | 10/1981 | LeBlanc et al. | 210/180 |
| 4,349,438 A * | 9/1982 | Sims | B01D 35/143 |
| | | | 196/128 |
| 4,369,110 A * | 1/1983 | Picek | B01D 27/02 |
| | | | 123/196 A |
| 4,830,745 A * | 5/1989 | van der Meulen | B01D 35/185 |
| | | | 184/6.24 |
| 5,322,596 A | 6/1994 | Arntz | |
| 5,843,284 A * | 12/1998 | Waters et al. | 196/46.1 |
| RE36,527 E | 1/2000 | Arntz | |
| 6,099,742 A * | 8/2000 | Komistek | B01D 17/00 |
| | | | 210/180 |
| 8,002,973 B2 | 8/2011 | Jacobs et al. | |
| 8,066,787 B2 | 11/2011 | Althöfer | |
| 2002/0046965 A1* | 4/2002 | de Sylva | 210/175 |
| 2002/0157997 A1* | 10/2002 | Binsfeld et al. | 210/180 |
| 2004/0206479 A1* | 10/2004 | Kroliczek et al. | 165/104.21 |
| 2008/0083676 A1* | 4/2008 | DePaul | 210/774 |
| 2009/0139917 A1* | 6/2009 | Geiger | B01D 35/185 |
| | | | 210/90 |

* cited by examiner

OIL CLEANER WITH HEATED EVAPORATION SURFACE, TO REMOVE WATER AND VOLATILES

CROSS REFERENCE TO RELATED APPLICATION

This application claims priority based on U.S. Provisional Application Ser. No. 61/634,318, filed Feb. 27, 2012.

STATEMENT REGARDING FEDERALLY SPONSORED RESEARCH AND DEVELOPMENT

Not applicable.

REFERENCE TO MICROFILM APPENDIX

Not applicable.

BACKGROUND OF THE INVENTION

Field of the Invention

Oil filters for use in circulating oil systems and particularly for use in circulating systems of vehicle engines and engines of stationary machines have long been known.

Many oil filters have been developed to remove particles from the lubricating systems of engines. In general, it has now been recognized that solid particles down to about 3 and even 2 microns in size can be removed by circulating oil through existing filter materials.

It has also long been known that machinery, such as engines, having cooperating moving parts and utilizing oil circulating systems, will have a longer life span if water and volatiles, as well as particles, are continuously removed from the circulating oil. Removal of water and combined fuel volatiles from circulating oil greatly extends the useful life of the oil being circulated and provides continuing better lubrication of movable parts of the machinery through which the oil is passed. Better lubrication through removal of water and volatiles reduces the volume and size of circulated damaging particles created and entrained in the circulating oil that is passed through a particle removing filter. This greatly extends the effective life of the filter while concurrently continuously providing well cleaned oil in the circulating system and longer, useful life for machine parts being lubricated.

Engel U.S. Pat. No. 4,189,351, issued Feb. 19, 1980 and Arntz U.S. Pat. No. Re. 36,527, issued Jan. 25, 2000 are typical examples of oil cleaners having both a particle removing filter to remove solid particles from a continuously circulating oil flow and an evaporator unit to remove water and volatiles from the oil flow. The patent to Engel discloses an oil reclamation device having a canister with a filter medium in a bottom part thereof to remove particles from upwardly flowing, circulating oil. An electrical heating element extends downwardly into a central area of a heat transmitting member that also serves as a top cover of the canister. An evaporator plate has concentric, curved walls extending upwardly from a bottom plate and is positioned between the filter medium and the heat transmitting member. The heat transmitting member has a series of downwardly projecting concentric, curved walls, spaced from and interspersed between the upwardly extending evaporator plate walls and extending into engagement with the bottom plate of the evaporator plate. Openings are provided, upwardly through the innermost evaporator plate wall and through the bottoms of the heat transmitting walls so that oil can flow both downwardly and upwardly between spaced evaporator plates and heating walls before being discharged from the canister.

The present invention does not require, or use, an electrical heater unit positioned in a potentially dangerous heat transmitting member that constitutes a cover for an oil reclamation device. Rather, as will be more fully set forth herein, it utilizes an electrical heating unit that is fully and safely inserted in a heating block, forming a floor of an evaporation chamber. The present invention also does not require or use an evaporator plate having a base plate with spaced apart, concentric, upstanding walls over which oil must be passed to provide an adequate evaporative surface. Further, the present invention does not require, or use, concentric heater walls interspaced between evaporator plate walls as part of a heat transmitting member to heat oil flowing between and against the sets of walls.

The Arntz U.S. Pat. No. Re. 36,527, is for an apparatus for removing solids and volatile contaminants from a circulating oil flow for use in small engine applications. The apparatus includes a filter unit that is screw threaded to an evaporator unit to facilitate replacement of filter media, as needed. The design of the unit constrains incoming oil to flow first through the filter media and then to an evaporator chamber. A central hub and a bottom wall of the evaporator chamber are directly heated by a heating element, and the evaporation chamber is closed by an imperforate lid so that heat loss is inhibited. During use of the Arntz apparatus evaporated water and fuel volatiles are expected to form sufficiently hot gasses that they will rise and exit the evaporation chamber through a vent passage formed in the imperforate top. In a cold environment, however, the gas vapors can condense at the top of the evaporation chamber and fall into and again contaminate the circulating oil. The Arntz apparatus does not include any means for positively propelling vaporized water and volatiles to the vent passage. The heater of the Arntz assembly is mounted to be fully inside the evaporator chamber and to extend into and to project upwardly from the central hub. The heater unit is continually subjected to contact with water vapor, volatiles and unburned fuel. It is believed that this arrangement presents potential safety hazards and can cause corrosion to the heater and potential heater failure. In addition, because of the positioning of the oil outlet from the evaporator chamber in the Arntz apparatus it is believed that back flow can occur to prevent proper oil cleaning when a vehicle on which the assembly is used is traveling uphill, downhill, or even tilted to one side or the other.

The presently preferred embodiment of the present invention provides an improved oil cleaner including a circulating oil receiving particle removing oil filter unit and a circulating oil receiving evaporator unit, through which circulating oil is passed, configured, as an integral unit. It will become apparent that the evaporator unit provides an oil cleaner for independent removal of water and volatiles from circulating oil, or to be used in tandem with one of many types of oil filters to also remove particles from the oil.

SUMMARY OF THE INVENTION

Objects of the Invention

A principal object of the present invention is to provide an improved oil cleaner, particularly adapted to vehicles powered by diesel fuel, gasoline, hydrogen and even other energy sources, such as electricity, having oil circulating systems providing wear protection for the engine or drivetrain components of such motor vehicles.

Another object is to provide an improved oil cleaner suitable for use with stationary engines and other devices having circulating oil systems.

Other objects are to provide an improved oil cleaner that is safer to use; that is designed to be less costly to manufacture than other known oil cleaners intended for use in the manner of the present oil cleaner; to provide a more trouble free efficient oil cleaner; and to provide an oil cleaner that, when used to clean circulating oil of vehicle engines, will function, properly to heat circulated oil during normal, safe vehicle travel that may involve forward, reverse or side tilting of the vehicle, Yet other objects are to provide an oil cleaner that optimizes heating of circulating oil with a safely mounted heater unit that does not come in contact with the circulated oil; and that additionally uses heated air to further heat the circulating oil and to positively propel evaporated water vapor and released volatiles from an evaporation chamber while returning entrained, unburned fuel, back into the circulating oil.

Features of the Invention

Principal features of a preferred embodiment of the invention include the use of a fine particle removing flow-through filter as a first stage unit of a two stage circulating oil cleaner. The first stage unit is releasably secured to a bottom of a second stage evaporator unit to more simply and more effectively remove particles, water, and volatiles from a continuously flowing oil stream.

Another principal feature of the present invention is a rapidly heated, heat conductive, heater block to receive and hold a heating element in the second stage evaporator unit. The heater block has a bottom surface beneath which circulating oil, under pressure is passed. The circulating oil is in contact with the bottom surface, to be heated by the heater block as it flows beneath the heating block positioned in an evaporator chamber; up a frontal section of the heating block; and forms a thin film as it moves onto and over, a spread-out, flat, or substantially flat, inclined, top evaporation surface of the hearing block. Heated air is also introduced into the evaporator chamber to be circulated into contact with and to further heat the circulating oil. Convection heating of the oil by the introduced heated air adds to the conductive heating resulting from the heating unit and heating block to even more effectively release water vapor, and volatiles from the circulated oil. The heated air, after coming in contact with the circulating oil, carries water vapor and volatiles released by heating of the oil out of the evaporator chamber through a top passage, to be returned to the source of the heated air. Any unburned oil entrained with the released water vapor and volatiles falls to the top surface of the heating block as the heated air cools and rises in the evaporation chamber to pass out of the evaporator chamber through the top passage The cleaned circulating oil passes out of the evaporator unit housing through a discharge opening at a bottom of the inclined top evaporation surface of the heating block.

In the particular embodiment disclosed, the housing of the second stage evaporator unit is cylindrical and has a bottom mounted to the top of the cylindrical canister of the first stage oil filter. When mounted for use with a vehicle, the oil cleaner has a top, a bottom, a front, a rear and a pair of opposed sides interconnecting the front and rear. The front of the oil cleaner is outside the evaporator unit, adjacent to the length of the heater block that extends from the bottom of the heater unit to the uppermost point of the inclined oil evaporation top surface of the heater block When mounted for use with a vehicle the front of the oil cleaner is positioned nearest the front of the vehicle. Similarly, the back of the oil filter is outside the oil filter, adjacent to the lowest point of the inclined oil evaporation surface.

Spaced apart, parallel, upright grooves are formed in the front peripheral wall of the heater block, when the heater block is cast, or otherwise formed. The groves and interior wall of the second stage evaporator housing, against which the grooves are snugly fitted, provide passages through which circulating oil from beneath the heater block flows to the frontal top edge of the oil evaporator surface of the heater block. The edges of the spaced apart grooves engage and cooperate with the inner wall of the second stage oil evaporator to provide passages allowing circulating oil to flow to the upper edge of the inclined oil evaporator surface. The forming of grooves in the heater block results in significant cost savings over the drilling of separate passages through the frontal periphery of the heater block, even though it should be apparent that spaced apart passages drilled through the periphery of the heater block from the bottom to the top of the inclined evaporation surface could, alternatively, be provided and used.

The spaced apart grooves are parallel and closely spaced, fully around the frontal area, i.e., from one side, around the front, to the other side of the heater block. It has been determined that a heater block oil evaporation surface angled at about 45 degrees from a top front to a bottom rear of the upright circulating oil cleaner serves to effectively spread circulating oil from all or some of the grooves over a large area of the planer oil evaporation surface. Even during design allowable, safe, vehicle forward, rearward and/or side tilting occurring during use of the vehicle, the inclined evaporation surface will receive circulating pressurized oil from the grooves. The oil cascades onto, spreads over and flow down the evaporation surface, under pressure and aided by gravity, to the discharge opening formed at the bottom of the inclined evaporation surface.

Additional objects and features of the invention will become apparent from the following detailed description and drawings, to those skilled in the art to which the invention pertains.

The Drawings

Listing of Numbers of Components

The reference numbers applied to components of the drawings of the invention are as follows:

| NUMBER | COMPONENT |
|---|---|
| 10 | oil cleaner. |
| 12 | first stage filter unit. |
| 14 | second stage evaporator unit. |
| 16 | cylindrical canister. |
| 18 | oil inlet ports. |
| 20 | outlet passage. |
| 22 | circulating oil. |
| 24 | filter medium. |
| 26 | tube. |
| 28 | holes. |
| 30 | sidewall. |
| 32 | top of tube 26. |
| 34 | inlet adaptor. |

-continued

| NUMBER | COMPONENT |
| --- | --- |
| 36 | upper end of tube 26. |
| 38 | interior threads. |
| 40 | groove. |
| 42 | outer edge of filter canister 16. |
| 44 | O-ring gasket. |
| 46 | side wall of cylindrical housing 48. |
| 48 | cylindrical housing of second stage filter unit 14. |
| 50 | bottom edge of side wall 46. |
| 52 | threaded central boss of second stage evaporator unit 14. |
| 54 | central bore through boss 52. |
| 56 | spac. |
| 58 | flange at the top of boss 52. |
| 60 | bottom of heating block 62. |
| 62 | heating block. |
| 64 | inner surface of housing 48. |
| 66 | peripheral edge of flange 58. |
| 68 | shoukder in housing 48. |
| 70 | front edge of heater block 62. |
| 72 | interior wall of housing 48. |
| 74 | rear peripheral edge of heater block 62. |
| 76 | angled evaporation surface of heater block 62. |
| 78 | spaced apart vertical grooves in heater block 62. |
| 80 | oil discharge port through housing 48. |
| 82 | heating element. |
| 84 | electrical wires connected to one end of heating element 82. |
| 86 | insert member of heating element 82. |
| 88 | hole in side wall 46. |
| 90 | cavity in heater block 62 |
| 92 | hot air. |
| 94 | port in side wall 96 of cap 98. |
| 96 | port. |
| 98 | cap |
| 100 | screw threads. |
| 102 | passage through cover 104 of cap 98. |
| 104 | cover of cap 98. |
| 106 | wall of cover 104. |
| 108 | screws. |
| 110 | port through side wall 46. |

DETAILED DESCRIPTION OF THE INVENTION

Figure 1:
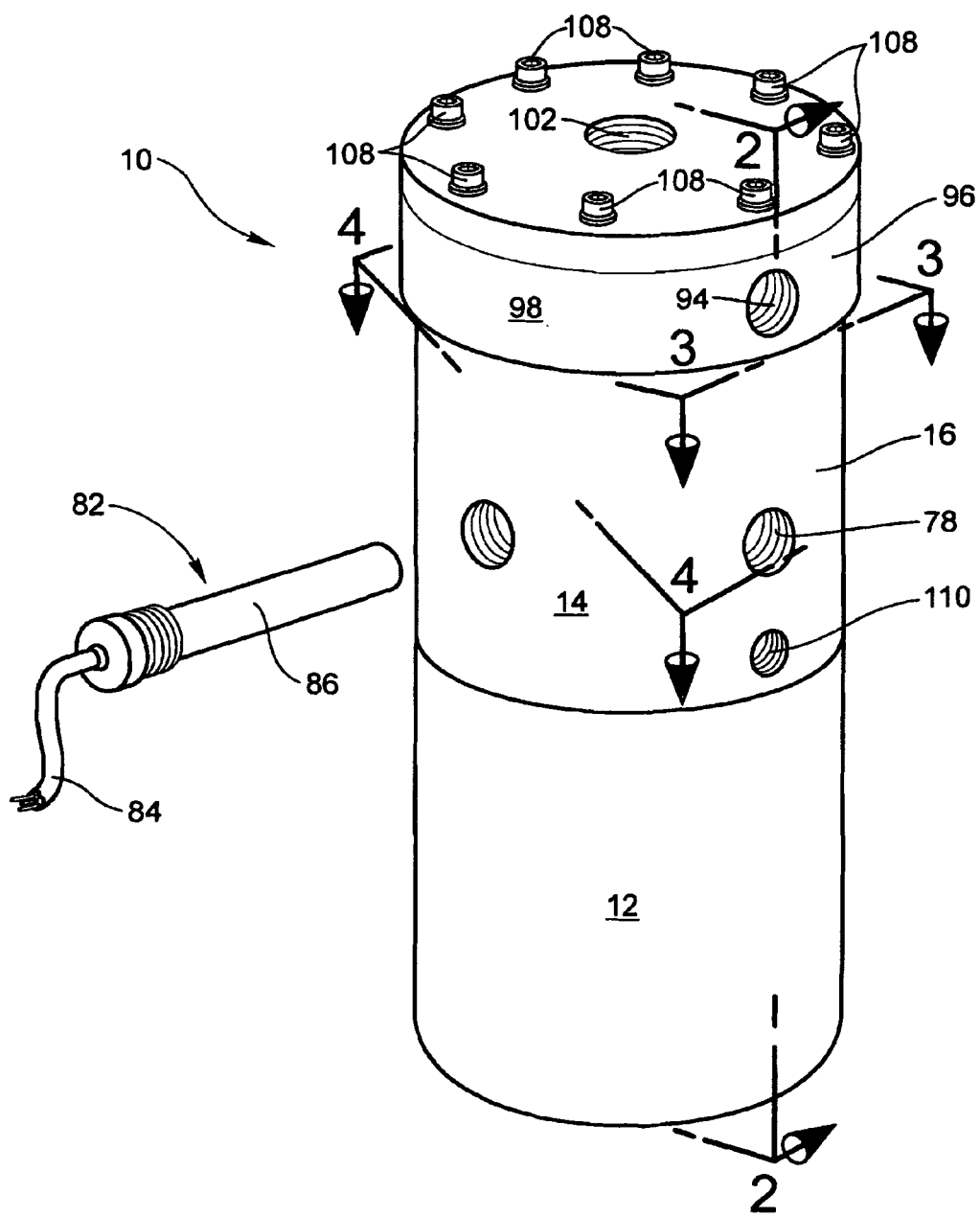
FIG. 1, is a perspective view of the oil filter of the invention.

Referring now to the drawings:

In the preferred illustrated embodiment, the oil cleaner of the invention, shown generally at 10, includes a first stage filter unit, shown generally at 12 and a second stage evaporator unit, shown generally at 14.

Figure 2:
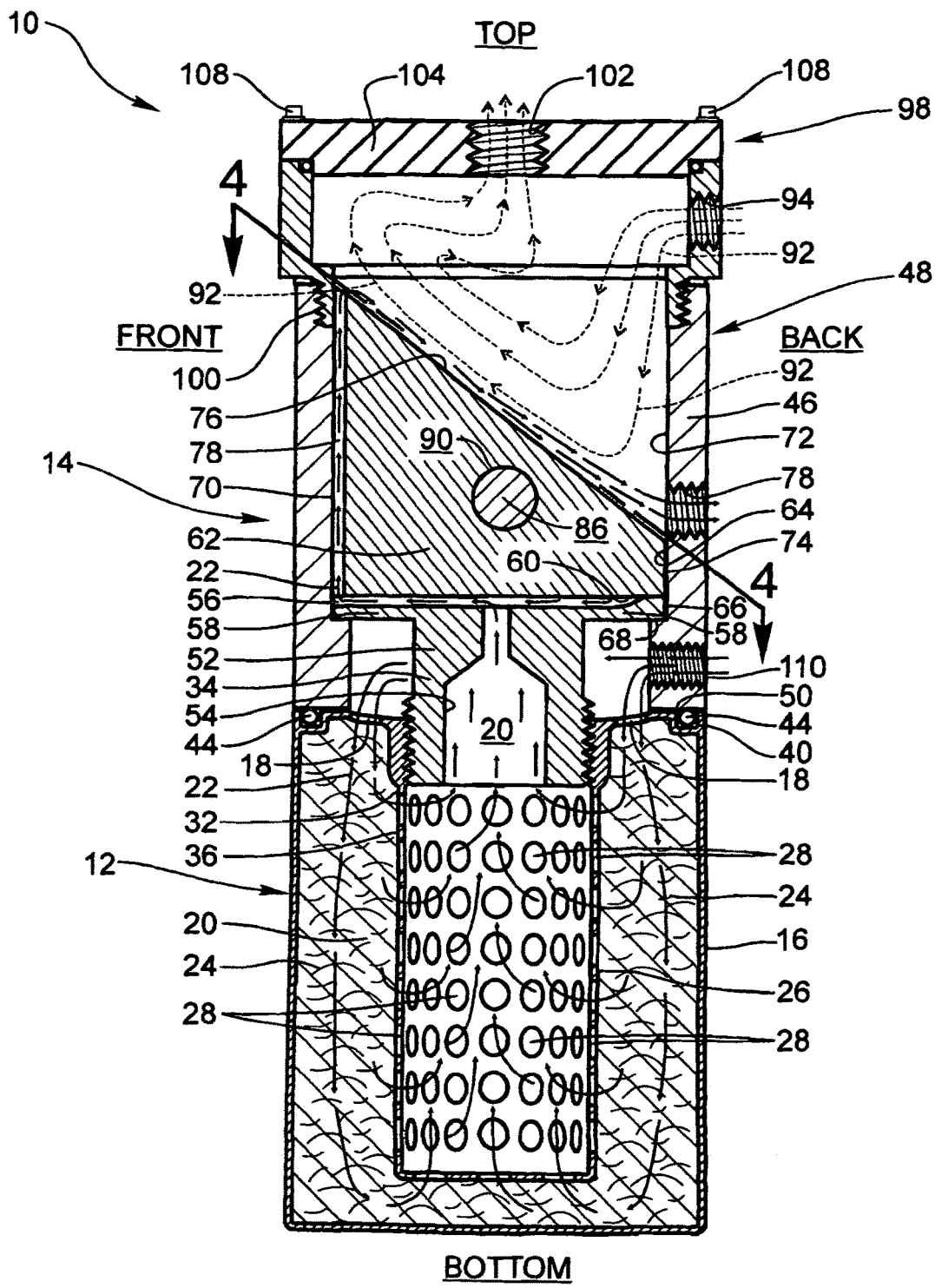
FIG. 2, a vertical section view, taken on the line 2-2 of FIG. 1.
Figure 3:
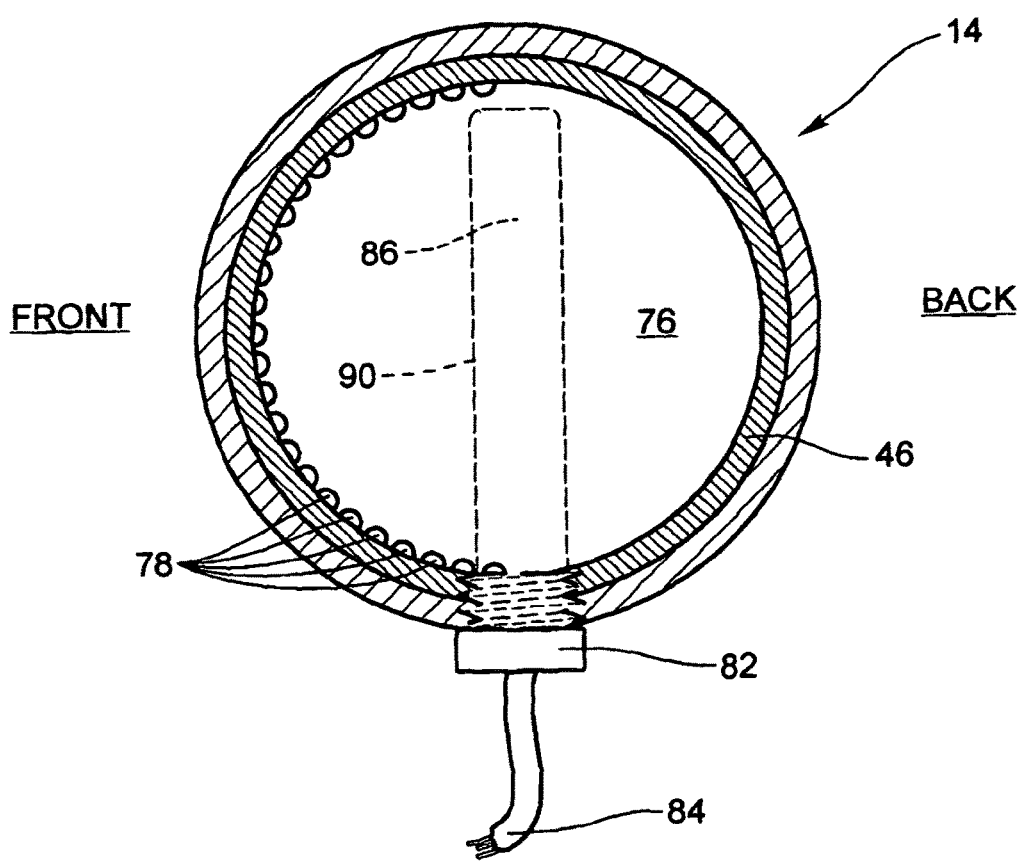
FIG. 3, a horizontal section, taken on the line 3-3 of FIG. 1.
Figure 4:
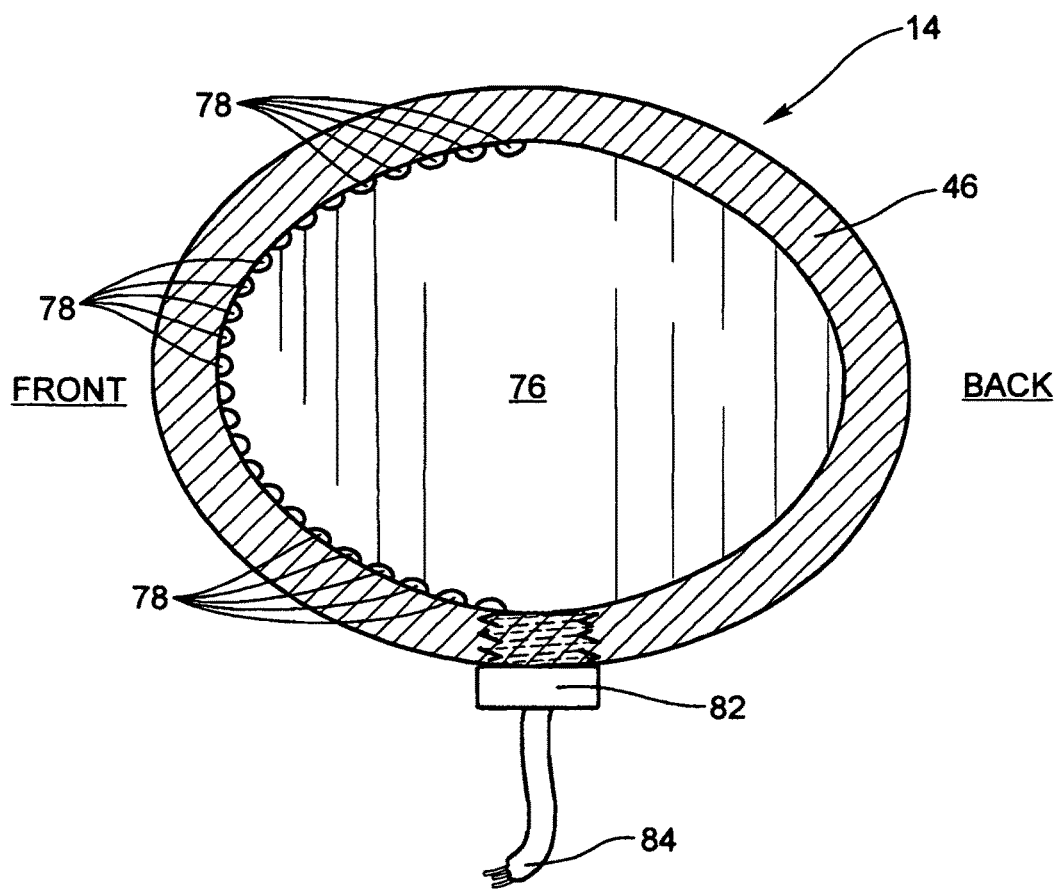
FIG. 4, an inclined sectional view, taken on the line 4-4 of FIG. 1.

The first stage filter unit 12 preferably includes a cylindrical canister 16 with oil inlet ports 18 extending through a top end thereof and an outlet passage 20 at the top center thereof. In use, circulating oil (shown by arrows 22, FIG. 2) enters the canister 16 through the inlet passages 18; passes through a suitable filter medium 24; flows into a tube 26 extending downwardly from the top center outlet passage 20 through holes 28, provided in the sidewall 30 of the tube. The circulating oil 22 discharged out the top 32 of the tube and into an inlet adapter 34 of the second stage evaporator unit 14. The upper end 36 of the downwardly extending tube 26 is interiorly threaded at 38 and a groove 40 is provided around the outer edge 42 of the filter canister 16, to receive an O-ring gasket 44 during assembly of the first stage filter unit 12 and the second stage evaporator unit 14.

An outside diameter of a side wall 46 of cylindrical housing 48 of the second stage evaporator unit 14 corresponds to the exterior diameter of the filter canister 16. A bottom edge 50 of the side wall 46 engages the O-ring gasket 32 on the top of the filter canister 12 and provides a sealed connection between the first and second stage units, 12 and 14, as assembled, to make the circulating oil cleaner 10. The second stage evaporator unit 14 also has an exteriorly threaded central boss 52 that is threaded into the interiorly threaded tube 26 of the first stage filter unit 12 during assembly of the circulating oil cleaner 10.

The boss 52 has a central bore 54 through which circulating oil flowing upwardly through the tube 26 of the stage one filter unit enters a space 56 in the second stage evaporator unit 14 of the circulating oil cleaner 10. Space 56 is formed between a flange 58 at the top of boss 52 and the bottom 60 of a heater block 62. Flange 58 extends outwardly from the top of boss 52 to an inner surface 64 of the housing 48 and has a peripheral edge 66 that rests on a shoulder 68 formed inside the housing 48. The O-ring seal, between the first stage filter 12 and the second stage evaporator unit 14, prevents leakage of oil from space 56.

Heater block 62 is formed from a highly heat conductive material, such as aluminum. Heater block 62 has a front peripheral edge 70 that extends upwardly from the flange 58 to just below the top of the front of housing 48 and that fits snugly against the interior wall 72 of housing 48. A rear peripheral edge 74 of the heater block 62 also fits snugly against the rear of interior wall 72 of housing 48 and extends upwardly from the flange 58 to an angled evaporation surface 76. The outer peripheral shape of the heater block 62, between the bottom 60, the front peripheral edge 70, the rear peripheral edge 74 and the inclined oil evaporation surface 76 is such that the heater block 62 conforms to and fits snugly into the housing 48.

Circulating oil 22, under pressure, flows from space 56, beneath and in contact with the bottom 60 of heater block 62; upwardly through spaced apart vertical (when the oil cleaner 10 is upright) grooves 78, formed in the periphery of the heater block 62, to the top of the heater block; and then cascades onto and spreads as a thin film over the downwardly angled oil evaporation surface 76. The film of circulating oil 22, under pressure and assisted by gravity, flows down the surface 76 and out of housing 48 through an oil discharge port 78. Discharge port 78 is formed through housing 48, just above the lowermost point of engagement of the angled oil evaporation surface 76 and the inner surface of housing 48. Oil 22 from discharge port 78, as is well known, is returned to the engine or other associated machine to be used and re-circulated.

A conventional electric heating element 82 has electrical connector wires 84 connected to one end and a heated insert member 86 at an opposite end. The insert member 86 is inserted through a hole 88 in the side wall 46 and is snugly fitted into and fills a cavity 90 formed in the heater block 62. Cavity 90 extends substantially fully through the heater block and transverse to the flow of circulated oil 22 moving down the inclined oil evaporation surface 76. During operation of the oil cleaner 10 the heating element 82 is activated to heat the heated insert member 86 and, by conduction, the entire heater block 62. The cavity 90 is preferably located closely beneath the oil evaporation surface 76 to insure maximum conductive heating of the oil evaporation surface 76 and the circulating oil 22 flowing down the oil evaporation surface 76. The circulating oil 22 is continuously conductively heated by contact with the heated heater block 62, or by convection if the oil does not contact heater block 62, as it enters chamber 56, passes upwardly through spaced apart vertical grooves 78 and flows onto and down the inclined oil evaporation surface 76.

Circulating oil 22, flowing as a film down the inclined evaporation surface 76 in the second stage evaporator unit 14 is additionally convection heated. Hot air (shown by arrows 92) enters the second stage evaporator unit 14 through a port 94 in a side wall 96 of a cap 98. Cap 98 is screw threaded at 100 to the inside of wall 46. The hot air 92 circulates within the housing 48 before exiting out a passage 102 through a cover 104 of the cap 98.

Cap 98 is secured to a wall 106 of the cover 104 by screws 108, passed through the cover and threaded into the wall 106. As it circulates within the housing 48 the hot air 92 passes over the circulating oil flowing down the inclined evaporation surface 76, thereby further heating the oil, while simultaneously entraining water vapor and volatiles to be vented with the hot air 22 out the passage 102. It will be apparent that flow direction through ports 94 and 102 can be reversed, if desired, or necessary, to best mount the oil cleaner for use.

Circulating oil 22, in the embodiment herein disclosed, enters the oil cleaner 10 through a port 110 in the lower portion of side wall 46 of housing 48 of the second stage evaporation filter 14. The oil enters chamber 56 formed between the upper end of cylindrical canister 16, the outer wall of central boss 52, the bottom of flange 58 and the inner surface of wall 48. The oil then flows through holes 28 and into and through the filter medium 24 of the first stage filter, as previously described. This arrangement of oil inlet port 110 for the oil cleaner 10 is particularly suited to use of the known first stage oil particle filter 12, shown and described herein. It will be apparent that different oil flow paths may be necessary if different shaped or types of known first stage oil filters are used to produce an oil cleaner as herein disclosed and claimed. For example, if the first stage oil filter has a separate inlet port through which circulating oil is introduced into a filter medium, it may not be necessary to utilize a port through the housing of the second stage evaporator unit to connect the oil cleaner into a flow of circulating oil.

Although a preferred embodiment of the invention has been herein disclosed, it is to be understood that such disclosure is by way of example and that variations are possible without departing from the subject matter coming within the scope of the following claims, which claims define our invention.

We claim:

1. An oil cleaner comprising:
   a housing;
   an evaporation surface positioned in the housing to remove water and volatiles from oil, the evaporation surface being substantially planar and extending downward from one sidewall of the housing to an opposing sidewall of the housing;
   an electric heating element configured to heat the evaporation surface;
   an inlet through which the oil can enter the housing and travel to the evaporation surface; and
   an outlet through which the oil that has passed over the evaporation surface can exit the housing;
   wherein the oil cleaner is sized and configured to be coupled to an engine of a vehicle;
   wherein the evaporation surface extends downward from the inside of the one sidewall of the housing to the inside of the opposing sidewall of the housing; and
   wherein the outside of the one sidewall of the housing and the outside of the opposing sidewall of the housing define, at least in part, the exterior boundary of the oil cleaner.

2. The oil cleaner of claim 1 comprising a first stage oil filter coupled to the housing, the first stage oil filter being configured to remove particulate matter from the oil before it enters the housing.

3. The oil cleaner of claim 1 further comprising an air inlet through which air can enter the housing and move adjacent to the evaporation surface and an air vent through which the air can exit the housing.

4. The oil cleaner of claim 1 comprising a heater block, wherein the evaporation surface is a top surface of the heater block and the electric heating element is configured to heat the heater block.

5. The oil cleaner of claim 4 comprising a passage through which the oil can flow from the inlet to the evaporation surface, wherein the passage directs the oil to a chamber beneath a bottom of the heater block and then up a side of the heater block to the evaporation surface.

6. The oil cleaner of claim 5 wherein the passage includes spaced apart, vertically extending grooves through which the oil can flow up the side of the heater block.

7. The oil cleaner of claim 1 wherein the evaporation surface extends downward from the one sidewall to the opposing sidewall at an angle of approximately forty-five degrees.

8. The oil cleaner of claim 1 wherein the housing is a cylinder and the evaporation surface fits snugly in the housing and the periphery of the evaporation surface fully engages an inner wall of the housing including the inside of the one sidewall of the housing and the inside of the opposing sidewall of the housing.

9. An oil cleaner comprising:
   a housing including an evaporation chamber;
   a heated evaporation surface positioned in the evaporation chamber to remove water and volatiles from oil;
   an oil inlet through which the oil can enter the evaporation chamber;
   an oil outlet through which the oil that has passed over the evaporation surface can exit the evaporation chamber;
   an air inlet through which air can enter the evaporation chamber and move adjacent to the evaporation surface, the air inlet opening into the evaporation chamber at a location above where the oil inlet and the oil outlet open into the evaporation chamber to allow the air to flow over the evaporation surface without flowing through the oil; and
   an air vent through which the air can exit the evaporation chamber, the air vent opening into the evaporation chamber at a location above a highest point of the evaporation surface when the oil cleaner is upright.

10. The oil cleaner of claim 9 comprising a first stage oil filter coupled to the housing, the first stage oil filter being configured to remove particulate matter from the oil before it enters the housing.

11. The oil cleaner of claim 9 comprising a heater block, wherein the evaporation surface is a top surface of the heater block.

12. The oil cleaner of claim 11 comprising a passage through which the oil can flow through the housing to the evaporation surface, wherein the passage directs the oil to a chamber beneath a bottom of the heater block and then up a side of the heater block to the evaporation surface.

13. The oil cleaner of claim 12 wherein the passage includes spaced apart, vertically extending grooves through which the oil can flow up the side of the heater block.

14. The oil cleaner of claim 9 comprising an electric heating element that heats the evaporation surface.

15. The oil cleaner of claim 9 wherein the evaporation surface is substantially planar.

16. The oil cleaner of claim 15 wherein the evaporation surface extends downward from one sidewall of the housing to an opposing sidewall of the housing.

17. The oil cleaner of claim 9 wherein the housing is a cylinder and the evaporation surface fits snugly in the housing and the periphery of the evaporation surface fully engages an inner wall of the housing.

18. An engine comprising the oil cleaner of claim 9.

19. A vehicle comprising an engine including the oil cleaner of claim claim 9.

20. The oil cleaner of claim 15 wherein the evaporation surface is a single surface that is substantially planar.

21. The oil cleaner of claim 9 wherein the air vent is located in a top wall of the housing.

22. The oil cleaner of claim 9 wherein the air vent is located approximately in the middle of a top wall of the housing.

23. The engine comprising the oil cleaner in claim 1.

24. The vehicle comprising the engine including the oil cleaner of claim 1.

25. The oil cleaner of claim 1 wherein the evaporation surface is a single surface that is substantially planar.

26. The oil cleaner of claim 3 wherein the air vent is located in a top wall of the housing.

27. The oil cleaner of claim 3 wherein the air vent is located approximately in the middle of a top wall of the housing.

28. The oil cleaner of claim 1 wherein the electric heating element is positioned to not come into contact with the oil in the oil cleaner.

29. The oil cleaner of claim 1 wherein the electric heating element is configured to conductively heat the evaporation surface.

30. The oil cleaner of claim 9 wherein the housing includes a sidewall extending upward and surrounding the evaporation surface to keep the oil on the evaporation surface, and wherein the air inlet extends through the sidewall.

\* \* \* \* \*